United States Patent
Miyaura

(10) Patent No.: US 7,389,851 B2
(45) Date of Patent: Jun. 24, 2008

(54) ELECTRIC POWER STEERING APPARATUS

(75) Inventor: Yasuhiko Miyaura, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 454 days.

(21) Appl. No.: 11/144,009

(22) Filed: Jun. 3, 2005

(65) Prior Publication Data

US 2005/0269151 A1 Dec. 8, 2005

(30) Foreign Application Priority Data

Jun. 3, 2004 (JP) ............................ 2004-165727

(51) Int. Cl.
*B62D 5/04* (2006.01)
*B62D 6/00* (2006.01)
(52) U.S. Cl. ..................... 180/446; 180/443; 701/41; 701/43
(58) Field of Classification Search ............... 280/421, 280/422, 443, 446; 701/41, 43; 318/432
See application file for complete search history.

(56) References Cited

U.S. PATENT DOCUMENTS

| | | | | |
|---|---|---|---|---|
| 5,469,357 A | * | 11/1995 | Nishimoto | ............ 701/41 |
| 5,552,684 A | * | 9/1996 | Wada et al. | ............ 318/293 |
| 5,752,208 A | * | 5/1998 | Lerner | ............ 701/41 |
| 5,920,174 A | * | 7/1999 | Kawada et al. | ............ 318/663 |
| 6,212,447 B1 | * | 4/2001 | Kohge et al. | ............ 701/1 |
| 6,397,969 B1 | * | 6/2002 | Kasai et al. | ............ 180/404 |
| 6,658,333 B2 | * | 12/2003 | Kawada et al. | ............ 701/41 |
| 6,795,762 B2 | * | 9/2004 | Itoh et al. | ............ 701/43 |
| 7,002,313 B2 | * | 2/2006 | Kawada | ............ 318/564 |
| 2003/0106737 A1 | | 6/2003 | Itakura | |
| 2006/0022626 A1 | * | 2/2006 | Kobayashi et al. | ............ 318/432 |

FOREIGN PATENT DOCUMENTS

| | | | |
|---|---|---|---|
| EP | 0 395 310 A1 | | 10/1990 |
| EP | 0 919 450 A1 | | 6/1999 |
| EP | 1 319 574 A2 | | 6/2003 |
| JP | 6-15331 | B2 | 3/1994 |
| JP | 3328595 | B2 | 7/2002 |

* cited by examiner

*Primary Examiner*—Lesley D. Morris
*Assistant Examiner*—Daniel Yeagley
(74) *Attorney, Agent, or Firm*—Sughrue Mion, PLLC

(57) ABSTRACT

An electric power steering apparatus controlling an operation of an electric motor by a control unit based on a torque signal from a torque sensor and executing a steering assist of a steering shaft via a reduction mechanism. The control unit includes a power supply voltage detector for detecting a power supply voltage signal of an in-vehicle power supply, and an output inhibitor for inhibiting an output in multiple stages based on a power supply voltage detected by the detector. A maximum driving current of the motor is limited when the voltage is decreased by the inhibitor to reach a first reference value (V1), a motor control output gain is decreased when the voltage reaches a second reference value (V2), and the output is turned off when the voltage reaches a third reference value (V3).

8 Claims, 5 Drawing Sheets

Prior Art

ELECTRIC POWER STEERING APPARATUS

BACKGROUND OF THE INVENTION

1. Technical Field

The present invention relates to an improvement of an electric power steering apparatus (hereinafter, refer to as an EPS) structured to apply a steering assist force generated by a motor to a steering system of a motor vehicle or a vehicle.

2. Prior Art

In general, in this kind of EPS, if the EPS is actuated in a state in which a battery is deteriorated in a vehicle side or a used load is increased, there is a case where a power supply voltage is decreased. In a state in which the power supply voltage is decreased, a gate driving voltage of an FET used in a motor driving circuit is decreased. In this case, as shown in FIG. 7, if a voltage ($V_{GS}$) between gate and source in the FET is decreased, an on resistance ($R_{DS(ON)}$) between drain and source is exponentially increased. In this connection, the following relation exists between a maximum driving current Imax and an allowable power value P. In other words, the expression $P=R_{DS(ON)}Imax^2$ is established. In this case, reference symbol P denotes an allowable power value of the FET, reference symbol RDS(ON) denotes an on resistance between source and drain in the FET, and reference symbol Imax denotes a motor maximum current allowing to circulate through the FET. As a result, if the value $R_{DS(ON)}$ becomes large at a time of controlling a drive of the motor, a power loss becomes large. Accordingly, if the power supply voltage is decreased, there is a risk that the FET is broken or burned out by a heat generation caused by the power loss of the FET.

Further, if the power supply voltage is significantly decreased, a supply voltage to a torque sensor is decreased. Accordingly, a sensor characteristics (a solid line) at a time of a normal voltage is decreased as shown by a sensor characteristics (a broken line) at a time of a voltage reduction, as shown in FIG. 8. For example, in the case where a sensor output at a time of a neutral steering is set to 2.5 V, a neutral position of a steering wheel is shifted at a value s1 in the drawing, and a current characteristics of the motor is also shifted at a value s2 in the drawing from the neutral position of the steering wheel, as shown in FIG. 9. Accordingly, a left-right difference is generated in a steering wheel steering force such that the steering force is light in a leftward steering and is heavy in a rightward steering, and in the case where the left-right difference comes off badly, a steering wheel shift or the like is generated, so that there is a problem that a steering feeling is deteriorated. As a result, in the conventional EPS, if the power supply voltage is decreased to a certain voltage value or less, an output of the EPS is forcibly turned off so as to stop the assist.

For example, in Japanese Patent No. 3328595, there is disclosed a structure which is provided with a power supply voltage detecting means and a fadeout control means, detects a power supply voltage signal of an in-vehicle power supply so as to compare with a reference value, reduces a target current signal in accordance with a time so as to reduce a current of a motor in accordance with the time in the case where the power supply voltage signal is equal to or less than a first reference value continuously for a fixed time, thereby gradually reducing an assist steering force, and set the target current signal to 0 so as to stop the assist in the case where the power supply voltage signal becomes equal to or less than a second reference value smaller than the first reference value.

Further, for example, in Japanese Patent Application Laid-open Publication No. 6-15331, there is disclosed a structure which is provided with a voltage detecting means, a current limit value setting means and a current limiting means, detects a voltage of any of feed lines of a power supply, limits a motor current in such a manner that the detected value does not exceed a current limit value, sets a current limit value which becomes smaller in accordance with a reduction of a power supply voltage, and can obtain an assist of a normal steering force in the case of such a light steering that the motor current does not reach the current limit value.

However, in the conventional structure mentioned above, in the case where the detected value of the power supply signal becomes smaller than the reference value (the current limit value), the structure immediately stops the assist, and prevents an adverse effect caused by a heat generation of the FET. In other words, in the former case, the structure is made such as to stop the assist in the case where the current is reduced at the first reference value so as to reach the second reference value. In the latter case, the structure is made such as to stop the assist in the case where the current becomes smaller than the current limit value. Accordingly, there is a problem that the assist frequently stops every time the voltage of the in-vehicle power supply is decreased from the reference value, particularly in the case where the output of the EPS is large. As a result, there is a problem that a reduction of an operability and a deterioration of a feeling are generated, and as a result a commodity characteristics of the EPS is significantly deteriorated.

SUMMARY OF THE INVENTION

Accordingly, an object of the present invention is to inhibit the output of the EPS in multiple stages in preparation for the case where the power supply voltage of the in-vehicle power supply is significantly decreased, thereby preventing the assist from easily stopping, to previously prevent a trouble such as a burnout, a breakage and the like of the FET, and to reduce an uncomfortable feeling caused by a shift of a neutral position of a steering wheel.

The object mentioned above of the present invention can be achieved by an electric power steering apparatus controlling an operation of an electric motor by a control unit on the basis of a torque signal from a torque sensor and executing a steering assist of a steering shaft via a reduction mechanism, wherein the control unit is provided with a power supply voltage detecting means for detecting a power supply voltage signal of an in-vehicle power supply, and an output inhibiting means for inhibiting an output in multiple stages on the basis of a power supply voltage detected by the power supply voltage detecting means, a maximum driving current of the electric motor is limited at a time when the power supply voltage is decreased by the output inhibiting means so as to reach a first reference value (V1), a motor control output gain is decreased at a time when the power supply voltage reaches a second reference value (V2), and the output is turned off at a time when the power supply voltage reaches a third reference value (V3).

Further, the object mentioned above can be effectively achieved by an electric power steering apparatus, wherein the output inhibiting means is provided with a maximum current limiting means for limiting a maximum current in the case where the power supply voltage is decreased so as to become smaller than the first reference value (V1), and a steering assist command value calculator reducing an output gain of a motor control in the case where the power supply voltage becomes smaller than the second reference value (V2).

Further, the object mentioned above can be effectively achieved by an electric power steering apparatus, wherein the output inhibiting means is provided with a maximum current limiting means for limiting a maximum current in the case where the power supply voltage is decreased so as to become smaller than the first reference value (V1), and a steering assist command value calculator adding a preset offset to the output from the torque sensor in the case where the power supply voltage becomes smaller than the second reference value (V2).

Further, the object mentioned above can be effectively achieved by an electric power steering apparatus, wherein the output inhibiting means is structured such as to decrease the output gain, and add the preset offset to the output from the torque sensor in the case where the power supply voltage is decreased so as to become smaller than the second reference value (V2), thereby correcting a deviation of steering force between leftward steering and rightward steering.

Further, the object mentioned above can be effectively achieved by an electric power steering apparatus, wherein the second reference value (V2) is set to such a power supply voltage value that the torque sensor output is decreased in accordance with the reduction of the power supply voltage.

DETAILED DESCRIPTION OF PREFERRED EMBODIMENTS

A description will be given of an embodiment in accordance with the present invention with reference to the accompanying drawings.

Figure 1:
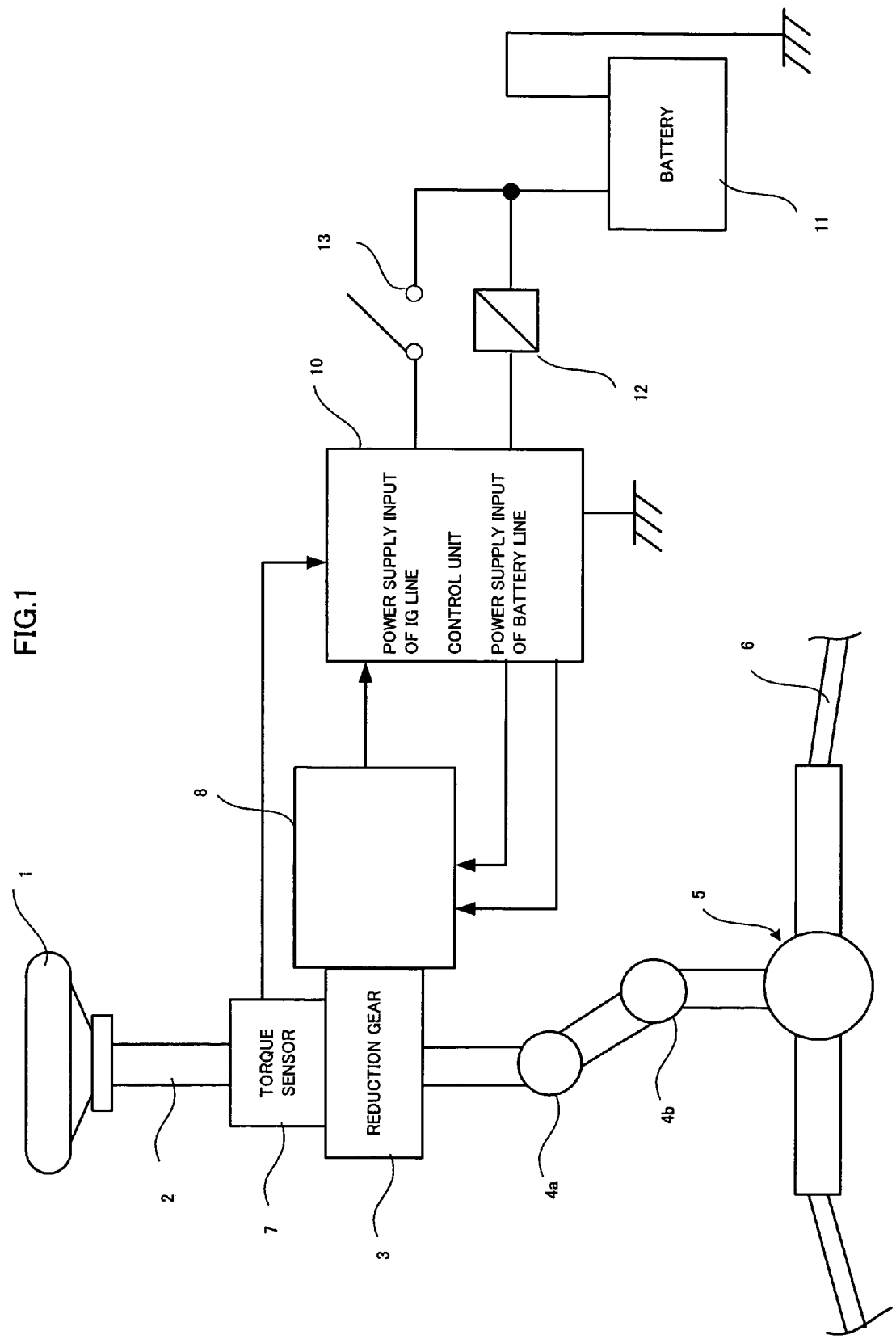
FIG. 1 is a structural chart showing a general structure of an electric power steering apparatus.

FIG. 1 is a view showing an outline structure of an electric power steering apparatus. A shaft 2 of a steering wheel 1 is coupled to a tie rod 6 of a steered tire wheel via universal joints 4a and 4b and a pinion rack mechanism 5. The shaft 2 is provided with a torque sensor 7 detecting a steering torque of the steering wheel 1, and a motor 8 assisting a steering torque of the steering wheel 1 is coupled to the shaft 2 via a reduction gear 3.

Further, an electric power is supplied to a control unit 10 serving as a control means of an EPS from a battery 11, the control unit 10 carries out a calculation of a current command value on the basis of a steering torque detected by the torque sensor 7, and controls a current supplied to the motor 8 on the basis of the current command value. In this case, reference numeral 12 denotes a fuse, and reference numeral 13 denotes an ignition switch.

Figure 2:
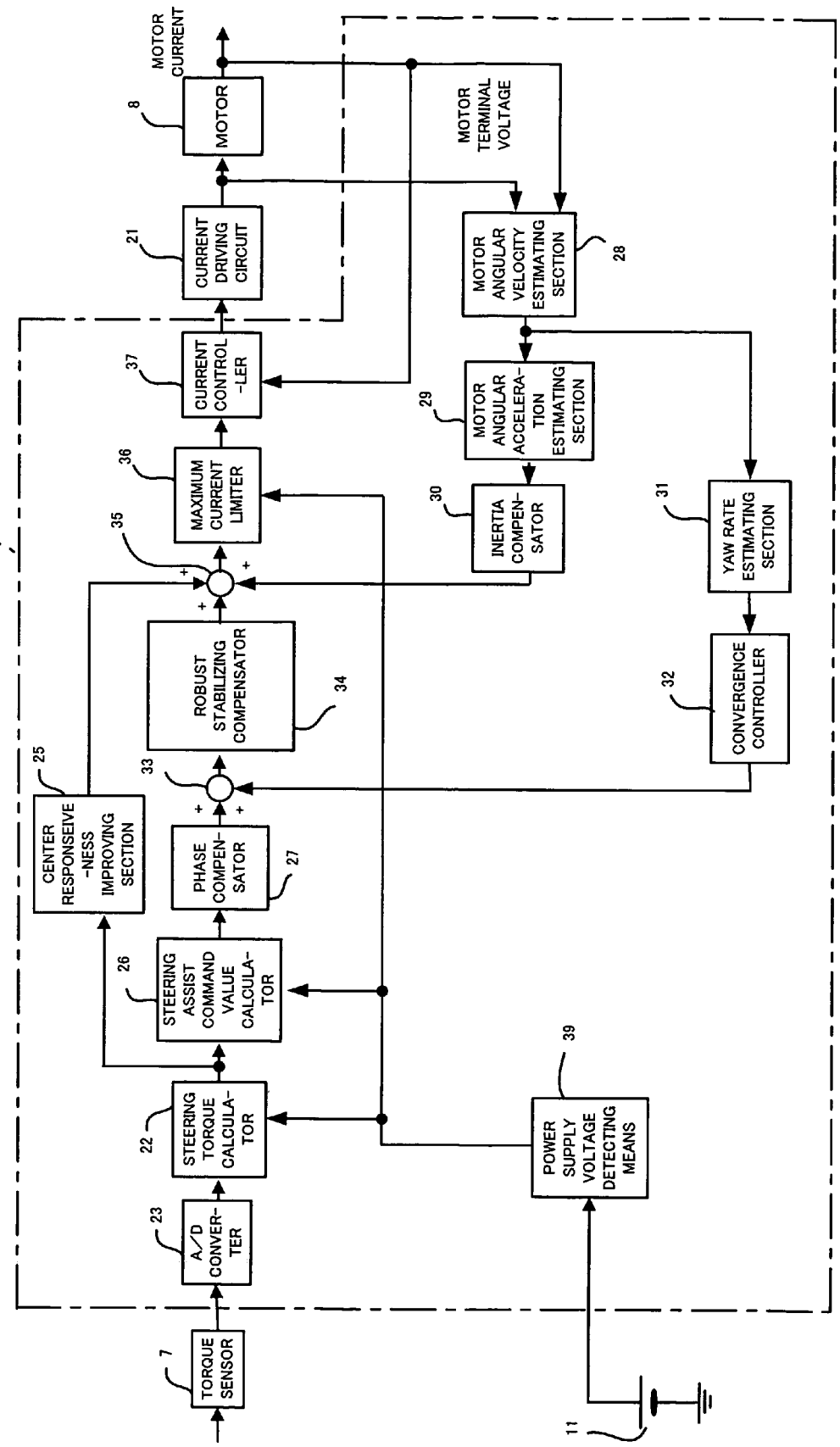
FIG. 2 is a block diagram of a control function of an electric power steering apparatus in accordance with the present invention.

Further, FIG. 2 shows an outline structure of a control system of the EPS. In the drawing, the motor 8 applying a steering assist force to a steering mechanism is controlled on the basis of the current command value calculated inside the control unit 10 via a current driving circuit 21. In other words, the control unit 10 receives a torque signal and a motor terminal voltage signal from the torque sensor 7 and the motor 8, and outputs a steering assist command value corresponding to the current command value to the current driving circuit 21 in accordance with a predetermined control.

Further, a steering torque calculator 22 inputs the torque signal from the torque sensor 7 via an A/D converter 23 so as to carry out a predetermined operation of the torque signal, and thereafter outputs to a center responsiveness improving section 25 and a steering assist command value calculator 26. This center responsiveness improving section 25 improves a control response near a neutral steering and achieves a smooth steering, and the steering assist command value calculator 26 calculates a steering assist command value corresponding to the current command value. Thereafter, a phase compensator 27 regulates a stability and a response of the control system.

Further, a terminal voltage of the motor 8 is input to a motor angular velocity estimating section 28, and calculates an angular velocity on the basis of the terminal voltage of the motor 8. An angular velocity signal from the motor angular velocity estimating section 28 is output to a motor angular acceleration estimating section 29. After an angular acceleration is calculated by the motor angular acceleration estimating section 29, a torque accelerating and decelerating an inertia of the motor 8 is eliminated from the steering torque by an inertia compensator 30. Further, the angular velocity signal from the motor angular velocity estimating section 28 is input to a convergence controller 32 via a yaw rate estimating section 31 so as to improve a convergence of a yaw of a vehicle.

Further, the signals from the phase compensator 27 and the convergence controller 32 are respectively input to a robust stabilizing compensator 34 via an adder 33, the robust stabilizing compensator 34 removes a peak in a resonance frequency of a resonance system comprising an inertia element contained in the detected torque signal and a spring element, and compensates a deviation of a phase of the resonance frequency inhibiting a stability and a response of a control system, on the basis of a predetermined characteristics formula. An output from the robust stabilizing compensator 34 is added by an adder 35 together with an output from the center responsiveness improving section 25 and the inertia compensator 30, and is thereafter input to a maximum current limiter 36.

Further, a current command value from the maximum current limiter 36 is input to a current controller 37 together with a motor current value fed back from a motor current detecting circuit (not shown) detecting the driving current of the motor 8. In the current controller 37, the structure is made such as to calculate the motor control signal on the basis of the signals so as to output to the current driving circuit 21, thereby carrying out a drive control of the motor 8.

Further, the control unit 10 is provided with a power supply voltage detecting means 39 for detecting a power supply voltage of the in-vehicle battery 11, and a power supply voltage signal detected by the power supply voltage detecting means 39 is output to the steering torque calculator 22, the steering assist command value calculator 26 and the maximum current limiter 36. An output inhibiting means for inhibiting the output of the EPS in stages is constituted by the steering toque calculator 22, the steering assist command value calculator 26 and the maximum current limiter 36, thereby inhibiting an increase of a power loss of the FET and reducing an uncomfortable feeling in operating the steering wheel.

Figure 3:
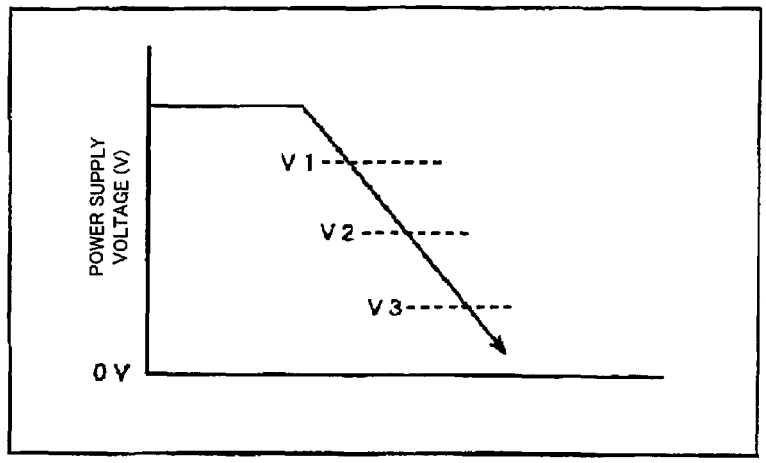
FIG. 3 is a view showing a state in which a power supply voltage is decreased.
Figure 4:
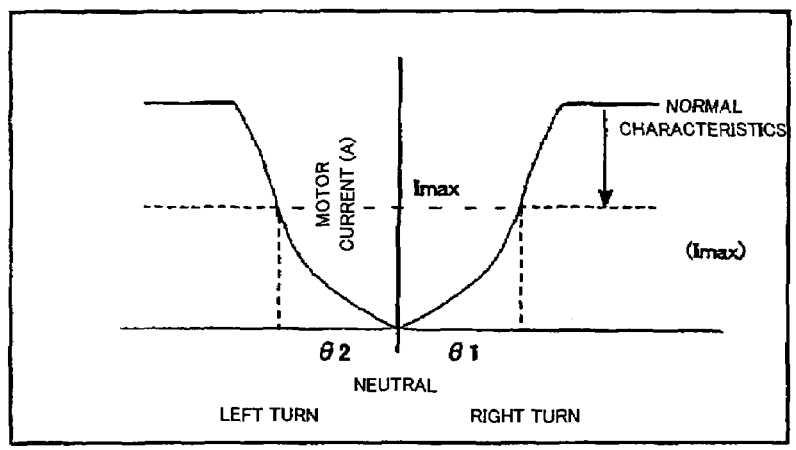
FIG. 4 is a view showing an example of a characteristics of a motor current with respect to a steering angle.

In other words, in the case where the power supply voltage is decreased in the maximum current limiter 36 by the output inhibiting means so as to become smaller than the first reference voltage value (V1) as shown in FIG. 3, the maximum current is limited to a value (Imax=$\sqrt{(P/RDS(ON))}$) shown by a broken line in FIG. 4 if the steering angle exceeds an angle $\theta 1$ in turning the steering wheel to the right, or the steering angle exceeds an angle $\theta 2$ in turning the steering wheel to the left, as shown in FIG. 4. Accordingly, even if a driving voltage used in the current driving circuit 21 is decreased, and an on resistance between drain and source of the FET becomes large, it is possible to make the motor driving current small, inhibit the power loss of the FET from being increased, and prevent a rapid heat generation of the FET.

Figure 5:
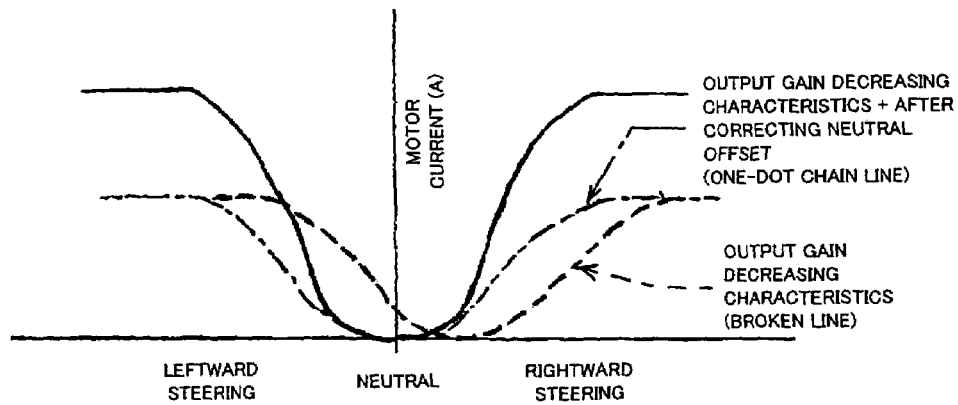
FIG. 5 is a view showing a rising characteristics in the case of decreasing an output gain in a current characteristics.

Further, in the case where the power supply voltage is further decreased so as to become smaller than the second reference voltage value (V2) at which the torque sensor output is decreased, an output gain in an assist map for controlling the motor is decreased by the steering assist command value calculator 26, and the rising characteristics of the current characteristics of the motor is made small as shown in FIG. 5. As a result, the current characteristics of the motor is changed from a normal characteristics (a solid line in FIG. 5) to a characteristics (a broken line in FIG. 5) at a time of decreasing the output gain, and it is possible to reduce the uncomfortable feeling in operation such that the steering wheel is shifted to the left due to the reduction of the output of the torque sensor, or the like.

Figure 6:
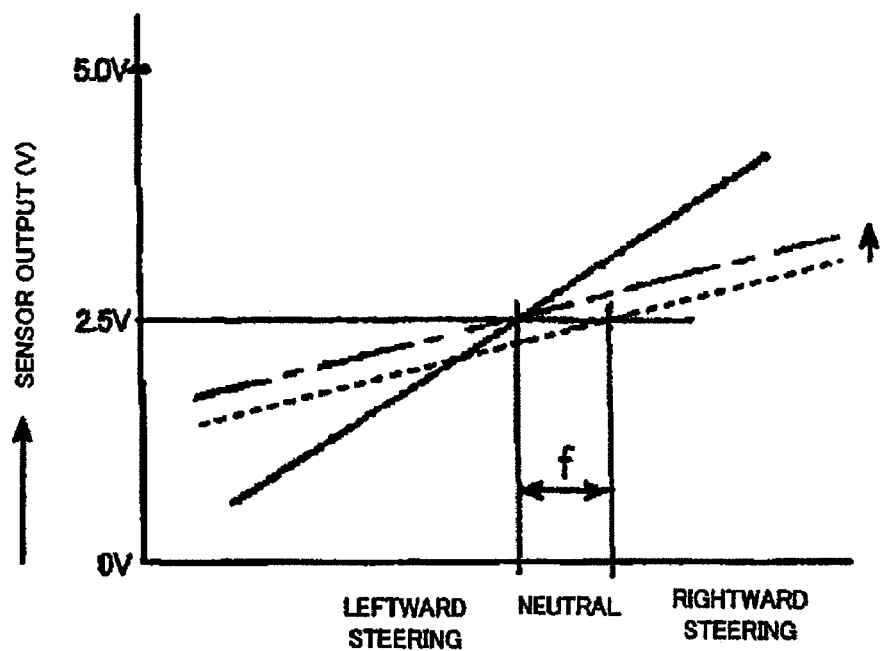
FIG. 6 is a view explaining a case where an offset part is added to a sensor output.
Figure 7:
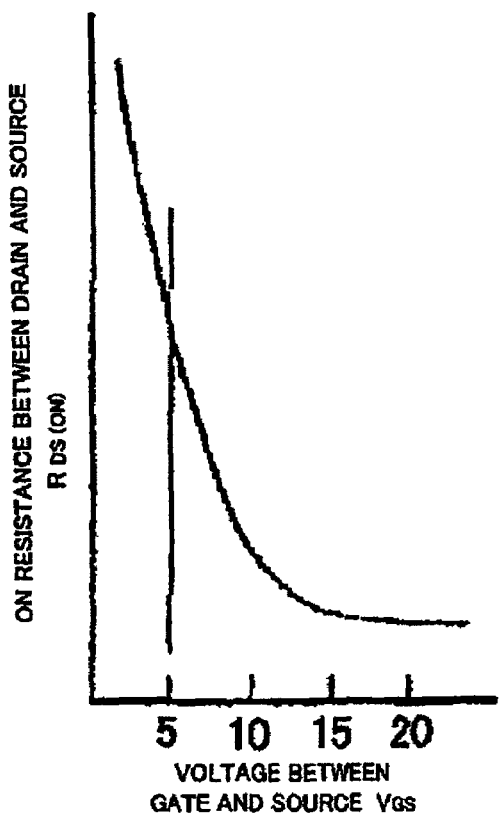
FIG. 7 is a view showing a relation of "voltage between gate and source" and "on resistance between drain and source".
Figure 8:
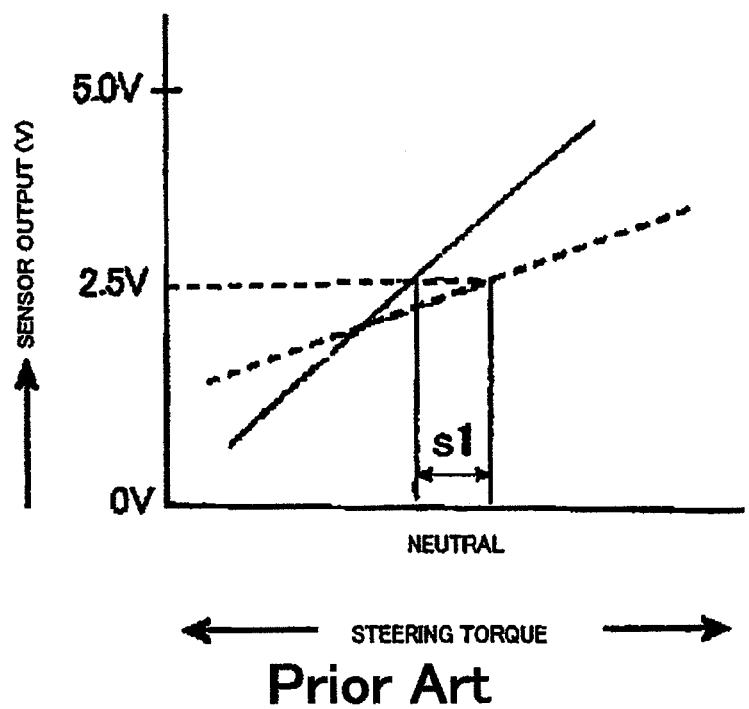
FIG. 8 is a view showing an example of a characteristics of a sensor output with respect to a change of a power supply voltage.
Figure 9:
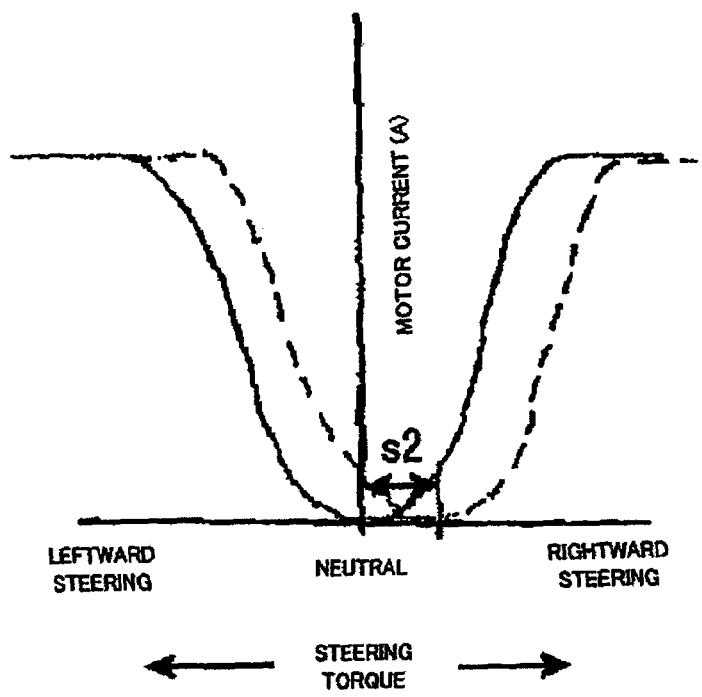
FIG. 9 is a view explaining a deviation of a motor current characteristics in accordance with a reduction of the power supply voltage.

At this time, in the case where the power supply voltage becomes smaller than the second reference voltage value (V2), the steering torque calculator 22 carries out such an operation that a predetermined offset component f is added to an output value from the torque sensor 7, as shown in FIG. 6. Since the offset amount has a correlation with the power supply voltage and can be forecasted, it is possible to previously set a predetermined offset amount. In other words, when the voltage is decreased, an output characteristics (a broken line in FIG. 6) of the sensor is gradually shifted to a decrease side from a characteristics (a solid line in FIG. 6) at the normal time, as shown in FIG. 6. Accordingly, when shifting the output characteristics of the sensor by adding the offset in a direction shown by an arrow in FIG. 6, the output characteristics after correcting the offset becomes a one-dot chain line in FIG. 6. Therefore, in the current characteristics of the motor, the deviation of steering force between leftward steering and rightward steering is corrected as shown by the one-dot chain line in FIG. 5. Accordingly, even if the power supply voltage becomes smaller than the second reference voltage value (V2), and the output of the torque sensor is decreased, a predetermined offset component is added to the output of the torque sensor 7, the deviation of steering force between leftward steering and rightward steering is apparently resolved and it is possible to reduce significantly the uncomfortable feeling in operating the steering wheel.

In this case, if the power supply voltage is decreased so as to become smaller than the second reference voltage value (V2), the deviation of steering force between leftward steering and rightward steering may be corrected by keeping the rising characteristics of the motor current as it is without decreasing the output gain of the motor control, and carrying out the offset correction of adding the predetermined offset component to the output from the torque sensor 7, whereby it is possible to reduce the uncomfortable feeling in operating the steering wheel.

Further, in the case where the power supply voltage is decreased so as to become smaller than the third reference voltage value (V3), it is possible to previously prevent the breakage such as the burnout of the FET or the like by turning off the output.

Accordingly, the control unit 10 is structured such that the output is inhibited in the multiple stages in accordance with the reduction of the power supply voltage of the in-vehicle power supply. In other words, if the power supply voltage becomes equal to or less than the first reference voltage value (V1), the maximum driving current of the motor 8 is limited by the maximum current limiter 36, and if the power supply voltage becomes equal to or less than such the second reference voltage value (V2) that the torque sensor output is decreased, the output gain is decreased by the steering assist command value calculator 26 and the steering torque calculator 22, and the offset component is added to the torque signal from the torque sensor 7. Accordingly, even if the power supply voltage is decreased, it is possible to make the driving current of the FET used in the current driving circuit 21 small in accordance therewith, inhibit an increase of the power loss of the FET, and prevent a rapid heat generation of the FET.

Further, since the structure is made such that the output gain is decreased and the predetermined offset component is added to the torque signal, while decrease of the torque sensor output into consideration, it is possible to effectively prevent troubles such as the breakage, the burnout and the like of the FET from being generated without turning off the output of the EPS until the second reference voltage value (V2) even if the power supply voltage becomes decrease than the conventional limit value, and it is possible to reduce significantly the uncomfortable feeling caused by the deviation of steering force between leftward steering and rightward steering.

As mentioned above, in accordance with the control apparatus of the electric actuator apparatus on the basis of the present invention, the output inhibiting means for inhibiting the output in the multiple stages is provided in the control unit, and is structured such as to limit the maximum driving current of the electric motor in the case where the power supply voltage is decreased so as to reach the first reference value (V1), to decrease the output gain and add the offset to the torque signal in the case where the power supply voltage reaches the second reference value (V2), and to turn off the output in the case where the power supply voltage reaches the third reference value (V3). In other words, even if the power supply voltage is decreased, the maximum driving current value is limited in the first stage, and the output gain is decreased and the predetermined offset is added to the torque signal in the second stage. As a result, even if the torque sensor output is decreased in accordance with the reduction of the power supply voltage, it is possible to effectively prevent troubles such as the breakage, the burnout and the like of the FET from being generated due to the heat generation caused by the increase of the power loss of the FET until the decrease power supply voltage than the conventional one, without turning off the output of the EPS, and it is possible to reduce significantly the uncomfortable feeling generated by the deviation of the neutral position of the steering wheel, whereby it is possible to obtain an improved steering feeling.

What is claimed is:

1. An electric power steering apparatus controlling an operation of an electric motor by a control unit on the basis of a torque signal from a torque sensor and executing a steering assist of a steering shaft via a reduction mechanism, wherein the control unit is provided with a power supply voltage detecting means for detecting a power supply voltage signal of an in-vehicle power supply, and an output inhibiting means for inhibiting an output in multiple stages on the basis of a power supply voltage detected by the power supply voltage detecting means, a maximum driving current of the electric motor is limited at a time when the power supply voltage is decreased by the output inhibiting means so as to reach a first reference value (V1), a motor control output gain is decreased at a time when the power supply voltage reaches a second reference value (V2), and the output is turned off at a time when the power supply voltage reaches a third reference value (V3).

2. The electric power steering apparatus as claimed in claim 1, wherein the output inhibiting means is provided with a maximum current limiting means for limiting a maximum current in the case where the power supply voltage is decreased so as to become smaller than the first reference value (Vi), and a steering assist command value calculator for reducing an output gain of a motor control in the case where the power supply voltage becomes smaller than the second reference value 16 (V2).

3. The electric power steering apparatus as claimed in claim 1, wherein the output inhibiting means is provided with a maximum current limiting means for limiting a maximum current in the case where the power supply voltage is decreased so as to become smaller than the first reference value (Vi), and a steering assist command value calculator for adding a preset offset to the output from the torque sensor in the case where the power supply voltage becomes smaller than the second reference value (V2).

4. The electric power steering apparatus as claimed in claim 1, wherein the output inhibiting means is structured such as to decrease the output gain, and add the preset offset to the output from the torque sensor in the case where the power supply voltage is decreased so as to become smaller than the second reference value (V2), thereby correcting a deviation of a steering force between leftward steering and rightward steering.

5. The electric power steering apparatus as claimed in claim 1, wherein the second reference value (V2) is set to such a power supply voltage value that the torque sensor output is decreased in accordance with the decrease of the power supply voltage.

6. The electric power steering apparatus as claimed in claim 2, wherein the second reference value (V2) is set to such a power supply voltage value that the torque sensor output is decreased in accordance with the decrease of the power supply voltage.

7. The electric power steering apparatus as claimed in claim 3, wherein the second reference value (V2) is set to such a power supply voltage value that the torque sensor output is decreased in accordance with the decrease of the power supply voltage.

8. The electric power steering apparatus as claimed in claim 4, wherein the second reference value (V2) is set to such a power supply voltage value that the torque sensor output is decreased in accordance with the decrease of the power supply voltage.

* * * * *